United States Patent [19]
Chamberlain

[11] Patent Number: 6,061,503
[45] Date of Patent: May 9, 2000

[54] METHOD FOR RESOLVING CONFLICTS AMONG TIME-BASED DATA

[75] Inventor: Robert Adam Chamberlain, Arlington Heights, Ill.

[73] Assignee: Zenith Electronics Corporation, Glenview, Ill.

[21] Appl. No.: 08/744,509

[22] Filed: Nov. 6, 1996

[51] Int. Cl.⁷ .................................................. G06F 15/16
[52] U.S. Cl. .......................................... 395/200.47; 707/6
[58] Field of Search ......................... 348/6, 906; 455/6.1; 364/222.9, 222.82; 395/200.47; 707/6, 7

[56] References Cited

U.S. PATENT DOCUMENTS 5,550,576   8/1996   Klosterman .
5,666,645   9/1997   Thomas et al. .......................... 455/6.1

*Primary Examiner*—Tommy P. Chin
*Assistant Examiner*—Ronald D. House

[57] ABSTRACT

A method for assembling data by sorting and filtering new data records and old data records, such as data records that an Electronic Program Guide data provider typically transmits to a head end of a cable television system. New incoming data records are combined with existing stored data records to form combined data records. Each of the data records is assigned an array index value. The combined data records are then sorted into one field of multiple fields. Within each field, each sorted data record is compared with other sorted data records and any conflicting data record is removed. The remaining non-conflicting data records are compared within each field and exact duplicate data records are removed from each corresponding field. The remaining processed data records are compared within each field and any older difference duplicate data record is removed. The filtered data records are then transmitted to a database. Because the filtered data records are purified and contain only current information, theoretically, the database will consume all data records. Reducing the number of data records transmitted to the database also reduces the time necessary to process the data records transmitted to the database.

22 Claims, 1 Drawing Sheet

METHOD FOR RESOLVING CONFLICTS AMONG TIME-BASED DATA

BACKGROUND OF THE INVENTION

1. Field of the Invention

This invention relates to a method for resolving conflicts between data records, such as those transmitted to a cable television (CATV) system head end, by sorting the data records and removing any conflicting or duplicate data record. More specifically, the method of this invention can be used to assemble a time structured database that resolves conflicts among batches of data windows that different Electronic Program Guide (EPG) data providers transmit to a CATV head end, before the EPG data is transmitted to and processed through a relational database.

2. Description of Prior Art

A head end is an originating point of signals for cable systems, such as cable television (CATV) systems. The head end usually receives signals from different sources or providers. The data format between different signals may or may not be identical. However, the transmitted data records normally contain at least one common data field, such as a service provider identifier field, a start time field of a program and/or a duration field of a program.

Data is typically transmitted to a head end in batch form, usually on a cyclic basis. Such data batches typically include data sets or data windows that span in time from a current date for a set length of time, into the future. Such data windows can be transmitted at any time. Some data windows overlap in time. The data window often represents a snapshot of a provider's database, at a particular time. Quite often, data windows are transmitted to a head end with all information, not just updated information, regardless of whether or not the head end previously received an unchanged portion of the information.

With current technology, an Electronic Program Guide (EPG) data file that contains information spanning ten days, for example, can take on average about eight hours to process before transmitting the EPG data file to a cable subscriber. The EPG data files require so much time to process because even though relatively few data records of a data window are updated, all data records of a data window, even duplicate and conflicting data records, are transmitted to conventional processors. There is an apparent need to significantly reduce the processing time.

SUMMARY OF THE INVENTION

It is one object of this invention to provide a method for processing only updated data records of a data window through a database by identifying and removing conflicting data records, exact duplicate data records, and/or difference duplicate data records from the data window before transmitting the data records to the processor.

It is another object of this invention to provide a method for sorting and filtering data records, such as those that a service provider may transmit to a head end.

It is another object of this invention to provide a method which sorts incoming data records into a service identifier field, a start time field or a sequence number field.

It is yet another object of this invention to provide a method for identifying and retaining a most significant data record.

According to the method of this invention, unchanged incoming data records are sorted and removed before processing the remaining updated data records through a database, such as a relational database. Theoretically and preferably, the relational database consumes 100% of all data records that are processed according to the method of this invention.

The above and other objects of this invention are accomplished with a method that receives and combines one or more incoming data records with any existing stored data record to form one or more combined data records. Incoming data records, such as those containing Electronic Program Guide (EPG) information, are typically transmitted by service providers, to a cable television (CATV) head end for example, in data windows that contain both updated and unchanged data records. Typically, one or more stored data records or old data records have been retained by a previous iteration of the method of this invention. However, it is apparent that upon an initial iteration of the method according to this invention, a stored data record may not exist.

Once received and combined with any existing stored data record, each combined data record is assigned an array index value. Each combined data record is then sorted into one field of predefined fields, such as a service identifier field, a start time field and/or a sequence number field of an EPG data record.

Within each field, the sorted data records are compared and any conflicting data record is removed. The remaining non-conflicting data records are then compared within each field and exact duplicate data records are removed. Also within each field, the unique data records remaining after removal of exact duplicate data records are compared and any older difference duplicate data record is removed. Thus, when the sorting, comparing and removing steps of this invention are complete, the last remaining data records which are current, non-conflicting and unique are transmitted to a database.

According to one preferred embodiment of this invention, it is only necessary to remove non-significant data records from an input stream. For example, identification of a significant record may be a function of a start time and/or an order in which the data record is received. For example, if a time conflict exists between two or more EPG data records, because the most recent data record will likely contain updated information, the last data record received will normally win a conflict and the earlier conflicting data record or records received can be purged or otherwise removed.

The method of sorting and filtering data records according to this invention is preferably configurable. In one preferred embodiment of this invention, the configuration consumes data records in a mode where the last data record received is the significant data record. If the particular configuration is damaging or detrimental to any particular type or order of data records, it is preferred that a mechanism exist to disable the sorting and filtering method of this invention and revert to receiving and processing raw input data records according to conventional technology.

The sorting and filtering method of this invention can be used to receive electronic program guide data records transmitted by a service provider, or an individual program provider such as Home Box Office™ or SHOWTIME™. Once data records are received and any conflicting and duplicate data record is removed, the purified data records which include only updated information can be transmitted to and processed through a relational database.

BRIEF DESCRIPTION OF THE DRAWING

The above-mentioned and other features and objects of this invention will be better understood from the following detailed description taken in conjunction with FIG. 1 which is a flowchart identifying method steps according to one preferred embodiment of this invention.

DESCRIPTION OF PREFERRED EMBODIMENTS

Figure 1:
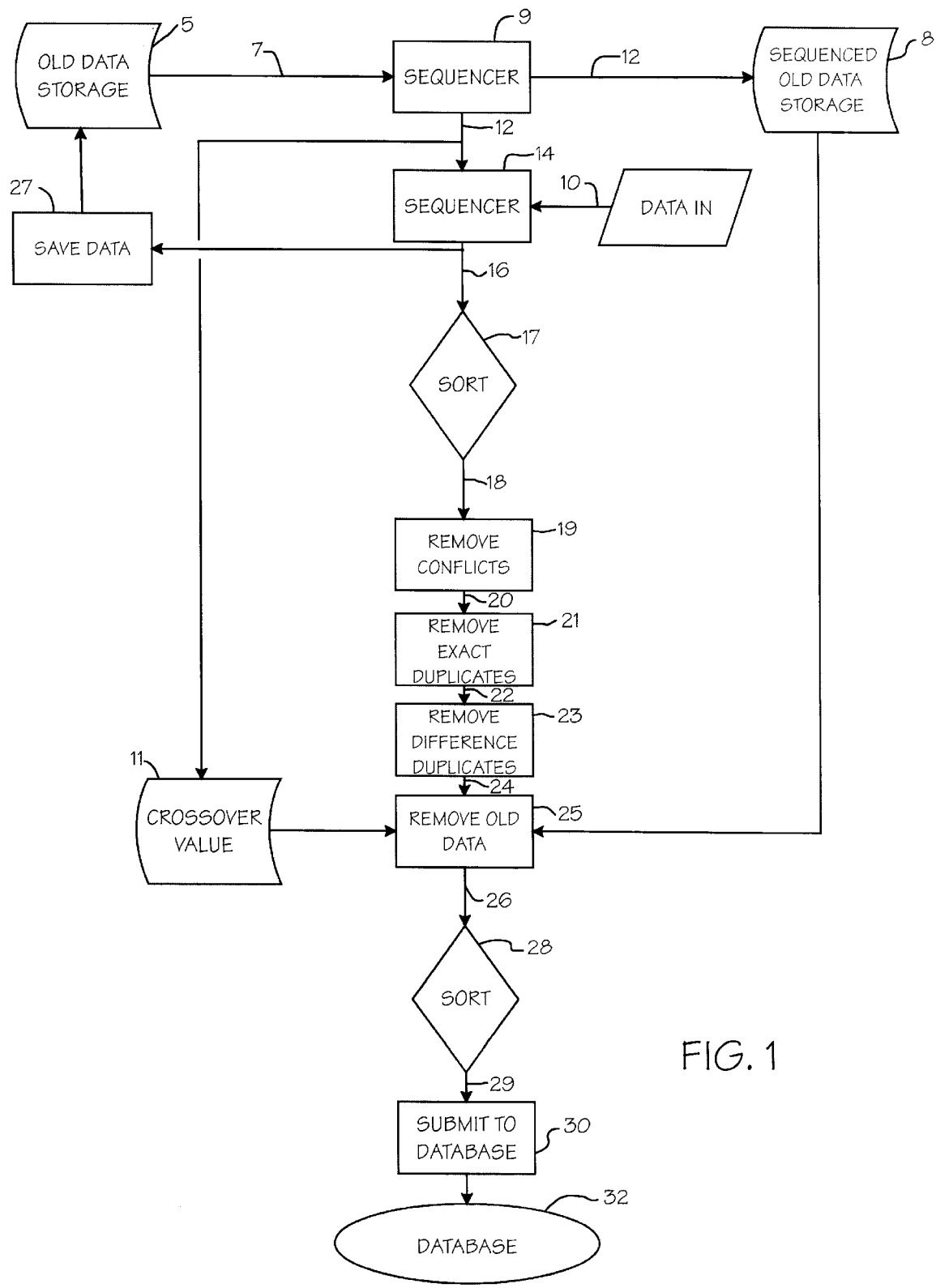

A method of sorting and filtering incoming data records, according to one preferred embodiment of this invention, is shown in the flowchart of FIG. 1. Incoming data records 10 transmitted by a service provider, such as StarSight™ or United Video™ which provide collated EPG data from several sources, or individual programming providers such as Home Box Office™ or SHOWTIME™, are received by new data sequencer 14. If any stored data record 7 exists in old data storage 5, old data sequencer 9 sequences each stored data record 7 by assigning a unique array index value, and then transmits sequenced old data records 12 to both sequenced old data storage 8 and new data sequencer 14. New data sequencer 14 sequences incoming data records 10 by assigning a unique array index value to each incoming data record 10. New data sequencer 14 also combines sequenced incoming data records 10 and any sequenced old data record 12 to form one or more combined data records 16. The array index value can be attached or embedded as a relational field within either each combined data record 16 or each stored data record 7 and/or each old data record 12. One or more combined data records 16 may be identified (step 27) and transmitted to old data storage 5.

When the system configuration of the method according to this invention operates, each combined data record 16 is preferably sorted (step 17) into one field of a plurality of predefined fields. For example, in one preferred embodiment three different fields exist: a service identifier field; a start time field; and a sequence number field. It is apparent that other predefined fields can be used for sorting combined data records 16.

The different fields can be assigned a primary sorting function, a secondary sorting function and the like. In one preferred embodiment according to this invention, the service identifier field is a primary sorting field and the start time field is a secondary sorting field. However, it is apparent that each field can be assigned any desired sorting function or priority. If a service identifier field is defined as a primary sorting field, then data records within different service identifier fields are not allowed to conflict with or duplicate each other.

In order to identify a conflict, stop times of sorted data records 18 can be compared. The duration field can be time added to the start time field in order to determine a stop time. A conflict may exist, for example, if one sorted data record 18 stop time is after a start time of a subsequent sorted data record 18 and both sorted data records 18 have different start times.

Within each field, each sorted data record 18 is compared (step 19) to other sorted data records 18 within the same field and any conflicting sorted data record 18 is removed (step 19). As used throughout this specification and in the claims, the phrase "conflicting data record" is intended to relate to any one sorted data record 18 in a particular field that conflicts with another sorted data record 18 in the same field. Also as used throughout this specification and in the claims, the phrase "removing any conflicting data records" is intended to relate to retaining one sorted data record 18 within a corresponding field while removing any other sorted data record 18 that conflicts with the one sorted data record 18, in the same field.

According to one preferred embodiment of this invention, a relational field of each sorted data record 18 is used to resolve a conflict between two sorted data records 18. Each sorted data record 18 may comprise a relational field, such as a unique value or unique number, and an information field, such as a start time, a duration or other similar data field.

In one embodiment according to this invention, conflicting sorted data records 18 can be identified if a stop time of one sorted data record 18 is later than a start time of another subsequent sorted data record 18. A stop time can be defined as a duration which is time added to a start time. In one preferred embodiment of this invention, between two conflicting sorted data records 18, the one having the highest array index value or number is removed from the field. It will be apparent that other logic or priority schemes can be used to identify which data record of a group of conflicting sorted data records 18 should remain within, and which data record or data records should be removed from, a corresponding field.

Once conflicting sorted data records 18 are removed (step 19) from within each field, the remaining non-conflicting data records 20 within each field are compared (step 21) to other remaining non-conflicting data records 20 within the same field and any exact duplicate data record is removed (step 21) thereby leaving one or more unique data records 22. An exact duplicate data record exists when all fields, which include each relational field and each information field, are the same between two non-conflicting data records 20. For example, the start time field and the duration field, as well as all other data fields are the same. Each unique data record 22 is also non-conflicting, due to the previous removal of conflicting sorted data records 18. As used throughout this specification and in the claims, the phrase "exact duplicate data record" is intended to relate to any non-conflicting data record 20 that is identical to another non-conflicting data record 20. Also as used throughout this specification and in the claims, the phrase "removing any exact duplicate data record" is intended to relate to retaining one non-conflicting data record 20 and removing any other non-conflicting data record 20 that is identical to the one non-conflicting data record 20.

In one preferred embodiment according to this invention, an exact duplicate data record is identified as one non-conflicting data record 20 which has a same start time as a subsequent non-conflicting data record 20. Preferably, an exact duplicate data record of non-conflicting data records 20 is retained and not purged or removed if it has been assigned a lowest array index value, such as a lowest array index number, within its corresponding field.

Once the exact duplicate data records of non-conflicting data records 20 are removed and only non-conflicting unique data records 22 remain within each field, each non-conflicting unique data record 22 is compared (step 23) to other non-conflicting unique data records 22 in the same field and any older difference duplicate data record of non-conflicting unique data records 22 is removed (step 23). If the array index values assigned to combined data records 16 are numbered in sequentially increasing order, then an older difference duplicate non-conflicting unique data record 22 can be identified as having a smaller array index number. Thus according to such preferred embodiment, the significant record retained is preferably the last received record and any earlier received difference duplicate non-conflicting unique data record 22 is redundant.

As used throughout this specification and in the claims, a difference duplicate data record, also referred to as a non-conflicting unique data record, relates to one non-conflicting unique data record 22 that has at least one field that is the same and at least one field that is different when compared with another non-conflicting unique data record 22. Also as used throughout this specification and in the claims, the phrase "removing any older difference duplicate record" is intended to relate to retaining only the last received non-conflicting unique data record 22 and removing any other non-conflicting unique data record 22 that is an earlier received difference duplicate data record of the last received non-conflicting unique data record 22. Throughout this specification and in the claims, the last received non-conflicting unique data record 22 is also referred to as remaining non-conflicting unique data record 24, which remains after any older difference duplicate record is removed by step 23. In one preferred embodiment according to this invention, a difference duplicate data record of non-conflicting unique data records 22 is retained and not purged or removed from the corresponding field if it has been assigned a highest array index value within its corresponding field.

A crossover value or number, the breakpoint between old data records and new data records, can be used to remove certain data records from old data storage 5 (step 25). As shown in FIG. 1, crossover value 11 can be stored and then used to remove or purge any combined data record 16 that has an array index value less than the defined and stored crossover value 11.

Processed data records 26 are sorted (step 28) in any suitable manner known to those skilled in the art. In one preferred embodiment according to this invention, such sorting (step 28) occurs by the start time as the primary field and the service identifier as the secondary field. After such sorting, the sorted data records 29 can be transmitted (step 30) to database 32, which is preferably a relational database.

Once combined data records 16 have been sorted and conflicting data records, exact duplicate data records and older difference duplicate data records have been removed, the remaining processed data records 26 can be transmitted to database 32, which is preferably a relational database. Processed data records 26 which are purified should be 100% consumed by database 32. Removal of all conflicting and duplicate data records from combined data records 16 results in a data window that contains only updated information, processed data records 26, which are transmitted to database 32. Reducing the number of data records before transmitting them to database 32 can significantly reduce the necessary processing time.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

EXAMPLES OF PREFERRED EMBODIMENTS OF THE INVENTION

The following examples represent particular fields within combined data records 16, each of which have been assigned an array index value as a number, as further explained below.

Example 1—Conflicts (Same Service Field)

Record A number 10: <Start time 10:00> - - - <Stop time 12:00>
Record B number 20: <Start time 10:00> - - - <Stop time 12:30>
Record C number 21: <Start time 10:00> - - - <Stop time 12:00>
Record D number 9: <Start time 11:00> - - - <Stop time 12:30>

Example 2—Duplicates With Conflicts Removed (Same Service Field)

Record A number 10: <Start time 10:00><duration 1><other data>
Record B number 20: <Start time 10:00><duration 1><other data>
Record C number 21: <Start time 10:00><duration 2><other data>

Example 3—Duplicates Without Conflicts Removed (Same Service Field)

Record A number 10: <Start time 10:00><duration 1><other data>
Record B number 20: <Start time 10:00><duration 2><other data>
Record C number 21: <Start time 10:00><duration 1><other data>
Record D number 9: <Start time 11:00><durationX><other data>

Example 4—Duplicates Old and New Data (Same Service Field)

Record A old file, number 10: <Start time 10:00><duration 1><other data>
Record B new file, number 20: <Start time 10:00><duration 1><other data>

Example 5—Duplicates Old and New Data (Same Service Field)

Record A old file, number 10: <Start time 10:00><duration 1><other data>
Record B new file, number 20: <Start time 10:00><duration 2><other data>

In Example 1, the stop time of record A is after the start time of record D and the start times of record A and record D are not the same, and thus a conflict exists. Also as shown in Example 1, the stop time of record A is after the start time of record B and the start time of record C, however the start times of record A, record B and record C are the same and thus they are duplicate data records. Also as shown in Example 1, when the significant data record is defined as the last received data record, the largest array index number should be kept, and even though the time of record D is after the time of record A, the array index number "10" for record A is larger than array index number "9" for record D and therefore record A should be kept and record D purged or removed from the same field.

As shown in Example 2, record A, record B and record C are duplicates because the start times are the same and record A, record B and record C were previously sorted by start time. Example 2 and Example 3 are equal for use in duplicate comparisons because conflicting fields of data records that still exist, such as the durations or stop times, are insignificant; database 32 will handle conflicting data through conventional technology.

In Example 4, record A has the smaller array index number "10" and thus record A is retained by step 19, and record B is removed or purged by step 19.

However, record A would be removed by step 23. Therefore, the result of Example 4 would be both data records A and B being removed or purged. In other words, nothing new has come in and no data record is transmitted to database 32. Example 4 illustrates an important aspect according to one preferred embodiment of this invention, wherein record B from a new file is compared to record A from an old file and record A, a data record older than record B, can win a conflict between old data and new data. Later in the method of this invention, record A would be removed or purged because record A is old data; the positive result of which would be no data to process. It is the particular order of steps 19, 21 and 23, as described above, that can potentially result in removing or purging one or more data records based upon data record relationships instead of data record contents.

In Example 5, record B would be retained and record A would be removed or purged (step 23) because a difference duplicate record with the largest array index number "20" is retained.

I claim:

1. A method for resolving conflicts among a combination of at least one incoming data record, based upon time, of each data window transmitted to a head end and any existing stored data record and thereby transmitting current information only to a database, the method comprising:

(a) receiving from a data provider and combining said at least one incoming data record and any existing stored data record to form at least one combined data record;

(b) assigning an array index value to at least one of said at least one incoming data record and any existing stored data record;

(c) sorting each said combined data record into one of a plurality of fields to form at least one sorted data record;

(d) within each of said fields comparing each said sorted data record and removing any conflicting sorted data record leaving at least one non-conflicting data record;

(e) within each of said fields comparing each said non-conflicting data record and removing any exact duplicate data record leaving at least one non-conflicting unique data record;

(f) within each of said fields comparing each said non-conflicting unique data record and removing any difference duplicate non-conflicting unique data record leaving any remaining non-conflicting unique data record or records;

(g) within each of said fields removing any of said remaining non-conflicting unique data record with an array index value less than a lowest array index value of said at least one incoming data record; and (h) transmitting said at least one current non-conflicting unique data record to the database.

2. A method according to claim 1 wherein a relational field of each said sorted data record is compared to resolve a conflict between a plurality of said sorted data records.

3. A method according to claim 1 wherein at least one said stored data record exists in an old data storage following a first iteration of the method.

4. A method according to claim 1 wherein said array index value is embedded as a field in a corresponding said combined data record.

5. A method according to claim 1 wherein said fields comprise at least one selected from the group of: a service identifier field, a start time field and a sequence number field.

6. A method according to claim 5 wherein said service identifier field is a primary sorting field.

7. A method according to claim 6 wherein said start time field is a secondary sorting field.

8. A method according to claim 5 wherein said at least one combined data record is compared within one said service identifier field.

9. A method according to claim 1 wherein a duration time is added to a start time to identify a stop time of each said combined data record.

10. A method according to claim 9 wherein said conflicting data record is identified if said stop time of one said combined data record is later than said start time of a subsequent said combined data record.

11. A method according to claim 1 wherein in each of said fields each said conflicting data record except one said conflicting data record having a highest array index value is removed.

12. A method according to claim 1 wherein said non-conflicting data record is compared within a service identifier field of said fields.

13. A method according to claim 12 wherein said exact duplicate data record is identified as one said combined data record having all said fields the same as a subsequent said combined data record.

14. A method according to claim 1 wherein in each of said fields each said exact duplicate data record except one said exact duplicate data record having a lowest said array index value is removed.

15. A method according to claim 1 wherein in each of said fields each said non-conflicting unique data record except one said non-conflicting unique data record having a highest said array index value is removed.

16. A method according to claim 1 wherein each said combined data record is sorted by a start time as a primary field of said fields.

17. A method according to claim 16 wherein each said combined data record is sorted by a service identifier field as a secondary field of said fields.

18. A method according to claim 1 wherein an Electronic Program Guide service provider transmits said at least one incoming data record based upon time.

19. A method according to claim 1 wherein any said conflicting sorted data record that is removed from within each of said fields is older than any remaining said non-conflicting data record within a same field of said fields.

20. A method according to claim 1 wherein any said exact duplicate data record that is removed from within each of said fields is newer than any remaining said non-conflicting unique data record within a same field of said fields.

21. A method according to claim 1 wherein any said difference duplicate non-conflicting unique data record that is removed from within each of said fields is older than any remaining said difference duplicate non-conflicting unique data record within a same field of said fields.

22. A method for assembling data for a database, the method comprising:

(a) receiving and combining at least one incoming data record and any existing stored data record to form at least one combined data record;

(b) assigning an array index value to each said data record;

(c) sorting each said combined data record into one of a plurality of fields to form at least one sorted data record;

(d) within each of said fields comparing each said sorted data record and removing any conflicting sorted data record leaving at least one non-conflicting data record;

(e) within each of said fields comparing each said non-conflicting data record and removing any exact duplicate data record leaving at least one non-conflicting unique data record;

(f) within each of said fields comparing each said non-conflicting unique data record and removing any difference duplicate non-conflicting unique data record leaving any remaining said non-conflicting unique data record or records;

(g) within each of said fields removing any of said remaining non-conflicting unique data record with an array index value less than a lowest array index value of said at least one incoming data record; and (h) transmitting said at least one current non-conflicting unique data record to the database.

* * * * *